UNITED STATES PATENT OFFICE.

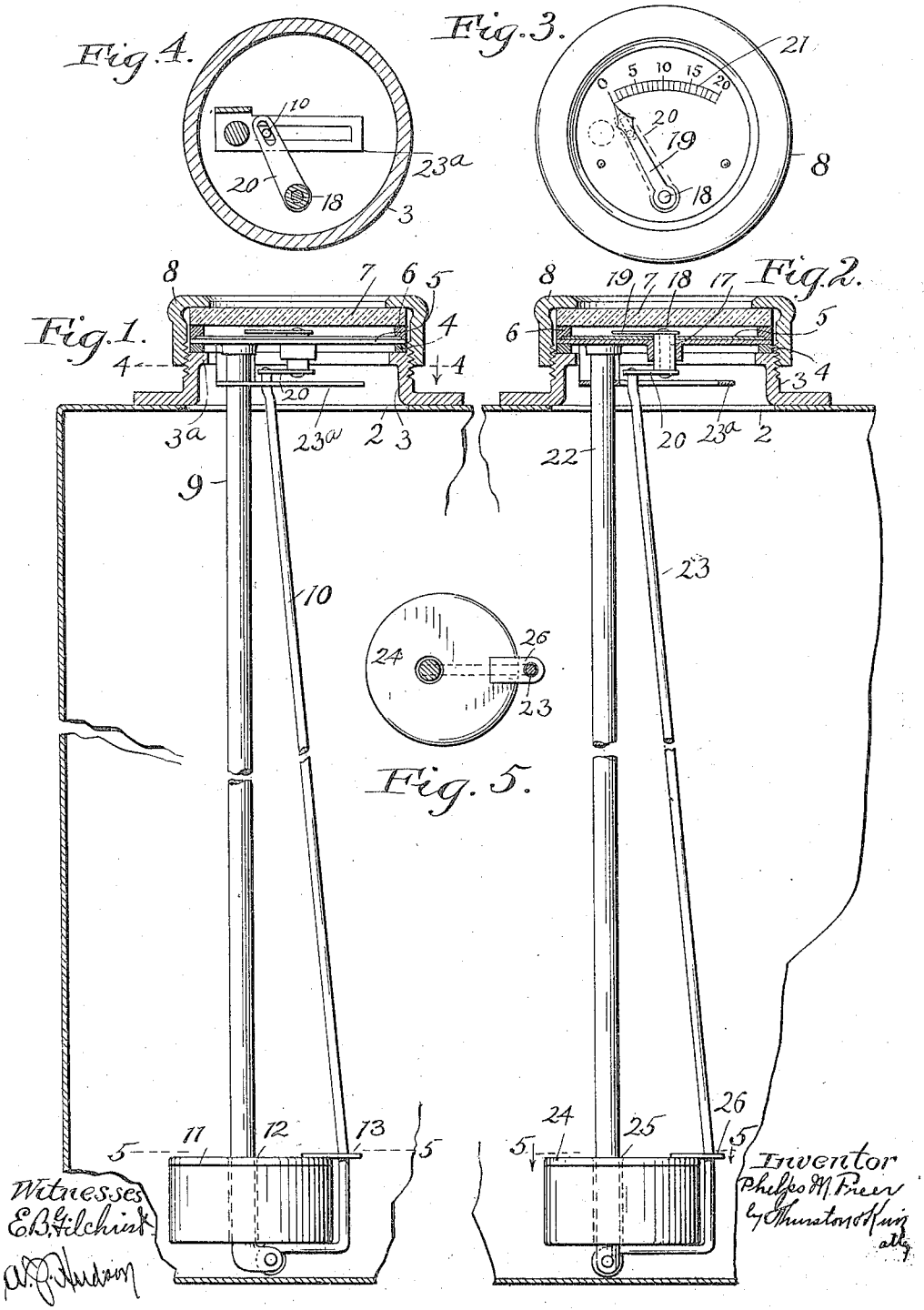

PHELPS M. FREER, OF DETROIT, MICHIGAN, ASSIGNOR TO A. SCHRADER'S SON, INC., OF BROOKLYN, NEW YORK, A CORPORATION OF NEW YORK.

GAGE.

1,166,124.  Specification of Letters Patent.  Patented Dec. 28, 1915.

Application filed June 21, 1913. Serial No. 774,967.

*To all whom it may concern:*

Be it known that I, PHELPS M. FREER, a citizen of the United States, residing at Detroit, in the county of Wayne and State of Michigan, have invented a certain new and useful Improvement in Gages, of which the following is a full, clear, and exact description.

This invention relates to a gage for indicating the quantity of liquid within a receptacle.

The object of the invention is to produce a device of the character described, which will be simple of construction and accurate and reliable in operation, and wherein, owing to the tendency of the indicating member to move from a position indicating a low level toward a position indicating a high level, the float as it rises is enabled to control such movement without being required to lift the weight of the indicating member.

The invention consists in the provision in a device having a float with suitable guiding means, of an indicating member the movement of which is adapted to be controlled by the float in its rising movement, for which purpose it is inclined relative to the path of movement of the float and is suitably controlled therefrom, and in providing the indicating member with means independent of the float which tend to move the indicating member from the position of low level to the position of higher level so that the indicating member has a tendency to move in the direction in which the float would cause it to move if such movement were solely produced by the rising movement of the float. According to my invention, therefore, the float permits or controls such movement and is not called upon to provide the entire "motive" power necessary therefor and accordingly the action of the float is much freer.

A desirable form in which my invention may be embodied is illustrated in the accompanying drawings, in which—

Figure 1 is an elevation with portions in section of the gaging device of this invention supported within a receptacle. Fig. 2 is an elevation partly in section of a modified form of gage supported within a receptacle. Fig. 3 is a top plan view of a gage indicator. Fig. 4 is a section upon the line 4—4 of Fig. 2; and Fig. 5 is a section on the line 5—5 of Fig. 2.

The receptacle which contains the fluid is indicated at 1, and may be of ordinary design. At the upper portion thereof there is an opening 2 which is surrounded by a fitting 3, the jointure between the fitting and the container being liquid tight. The fitting 3 is provided with an inwardly turned flange 3ª at the upper portion thereof, and upon this rests a packing ring 4. Above the packing ring is a plate 5, and resting upon the plate is a second packing ring 6. Above the last mentioned packing ring is a glass plate 7, and holding these all in place is a cap 8, which is provided with screw threads upon the interior lower portion thereof, which engage with screw threads formed upon the outer portion of the fitting 3. This cap is formed with an inwardly extended flange at the upper portion which engages with the glass 7, and, as will be apparent, when the cap is screwed down, it will tightly hold all the various elements which have been superimposed one above the other. The packing will be compressed so as to make a tight joint.

A depending rod 9 is secured to the plate 5, and this rod extends downwardly to substantially the bottom of the receptacle. Adjacent the lower end of the rod 9 there is pivoted an indicator rod 10. This rod extends upwardly to the top of the container, and indicates, by its movement, the quantity of fluid within the container. One way of visualizing this indication may be by a construction such as shown in Fig. 2, wherein a pointer coöperates with a dial mechanism.

Referring again to the form shown in Fig. 1, it will be noted that the indicator rod 10 is bent near the lower portion thereof to form an angle with the upper portion, and this indicator rod is pivoted upon a portion of the rod 9, which extends at an angle to the main portion thereof, so that the pivotal point is not upon the longitudinal axis of the rod.

By means of the rod 9 there is slidably guided a float 11. In the particular construction shown, the guiding is accomplished by providing the float with an opening 12, which is of such a size with respect to the diameter of the rod that the float may freely slide upon the same.

The float is also slidably mounted upon the indicator 10. In the particular instance shown, this mounting is accomplished by an arm 13 which is provided with an opening of sufficient size that the same may slide upon the indictor rod 10.

In the form shown in Fig. 2, the fitting 3 which surrounds the opening in the upper part of the tank, as in the case shown in Fig. 1, supports a packing ring 4 and a dial plate 5 above the same. This plate is formed with a central opening through which extends a sleeve 17, and through the sleeve there extends a short arm or crank 18, which, at one end, is secured to a pointer or indicator 19, and its opposite end is secured to a crank 20. The pointer 19 coöperates with a scale 21, as indicated in Fig. 3, and in this manner indicates the quantity of fluid within the container.

The depending rod 22 is carried by the plate 16, and at its lower portion is pivotally connected with the indicator rod 23 which at its lower portion is bent at an angle with respect to the upper portion to form an extension, and the pivotal connection between the rod 22 and the indicator rod 23 lies substantially in the longitudinal axis of the rod 22.

A float 24 is slidably mounted upon the rod 22. In the particular instance shown, the float is provided with an opening 25, so that the float has a sliding fit on the rod 22. The float is also slidably mounted upon the rod 23, and in the instance shown, this is accomplished by an arm 26, which has an opening in it through which the rod 23 may pass.

The operation of the device is obvious, for, as the liquid is caused to enter the tank, it will elevate the float, and as the float is elevated, it will be held in a fixed path of movement by the guide rods 9 or 22. This rising of the float will therefore permit the indicator rods to move away from its guide rod, and in this manner operate the indicating mechanism so that the dial pointer will indicate the quantity of liquid within the tank. Obviously, the device must first be calibrated, but, after once calibrated, will indicate with accuracy the quantity of liquid in the tank.

In both of the constructions shown in Figs. 1 and 2, the indicator rods are so mounted, that if free to move, they would, by their own weight, fall away from the supporting or guiding rods. That is to say, a vertical line through the center of gravity of the indicating means does not pass through the pivotal point between the indicator rod and its support. As before stated, it is not necessary that the indicator rod be pivoted upon the supporting rods 9 or 22, nor is it necessary that the pivoting of the indicator rod be in line with the longitudinal axis of the supporting rod. This forms a convenient method of manufacture, but the only precaution to be observed is, as before stated, that the vertical plane of the center of gravity lies beyond the pivotal point of the indicator rod.

In this manner, it will be seen that the float does not have to lift the weight of the guide rod, as it ascends. It is merely restraining the indicator rod from falling to its extreme position. In this manner, the apparatus is more sensitive, and less likely to indicate erroneously the quantity of fluid within the tank.

It will be noted in both Figs. 1 and 2, that the float is mounted upon the guiding rod, so as to be slightly off center. In this way, the float is prevented, or substantially prevented from binding upon the rod 9 as it ascends.

If the float be mounted centrally upon the rod 9, or the rod 22, then when it is elevated by rising on the liquid which enters the tank, the slight dragging action of the arm 13 or the arm 26 upon the guide rod would tend to cant the float, and in this manner produce a binding action. By arranging the float with respect to the rod 9, and the indicator rod 10, as shown in the drawing, it will be seen that a greater buoyant action will take place upon that portion of the float which lies between the two rods than upon that portion of the float which is beyond the supporting rod, and the parts are so arranged that the buoyant action upon the portion of the float between the supporting rod and the guide rod will overcome the slight drag between the float and the indicator arm, and will thus prevent the canting of the float.

I have illustrated in the accompanying drawing and have described the best form of my invention now known to me, but I am well aware that it is not the only form, as the means whereby the indicating rod is given a tendency to move from the indicating position of low level to the indicating position of a higher level may be modified within the skill of the mechanic and other and equivalent means substituted for those illustrated to accomplish this same result within the appended claims.

Having thus described my invention, what I claim is:

1. In a fluid gage indicator, the combination with a fixed guide, of an indicator member, a float guided by said guide and having a sliding engagement with said indicator member, said indicator member having a free end adapted to move to indicating position and a pivoted end beneath the float and said member being offset from its pivot, whereby the center of gravity of said indicating member is between its pivotal point and the engagement with the float, and having its upper end bent toward a vertical plane passing through said pivot so that the indicator member tends normally to fall away from the float, and the float as it rises permits the indicating member to fall away from the guide to indicating position.

2. In a fluid gage indicator, the combination with a fixed guiding member, of an indicator means pivoted at one end, the opposite end being free to move to an indicating position, a float having sliding engagement with both the indicator member and the guiding means, said indicator member being pivoted adjacent an end of the guiding means at a point which lies between the longitudinal axis of the guiding means, and a vertical line passing through the center of gravity of the indicator member.

3. In a fluid gage indicator, the combination with a fixed guiding means, of an indicator rod, a float engaging the indicator rod, and guided by the guiding means, said indicator rod having a free end adapted to move to indicating position, and a pivoted end mounted beneath the float, said indicator rod being offset from its pivot so that the center of gravity thereof lies beyond the vertical plane of the pivotal axis of the indicating rod, and having its upper end bent toward a vertical plane passing through said pivot, the float as it rises along the guiding means permitting the indicator means to fall away from the guiding rod under restraint, to indicating position.

4. In a fluid gage indicator, the combination of a fixed guiding means, of an indicator rod free at one end to move to an indicating position and at its opposite end having an angular extension, said indicating rod being pivoted at the end of the angular extension, the angle between the parts of the indicating rod being such that the indicating rod normally tends to fall away from the guiding means, a float having sliding engagement with both indicating rod and guiding means, thereby restraining the indicating rod to move in fixed relationship to the guiding means as the float ascends the guiding means.

5. In a fluid gage indicator, the combination with a fixed guiding means, of an indicator member, a float engaging the indicator member and guided by the guiding means, said indicator member having a free end adapted to be moved to indicating position, and a pivoted end mounted adjacent the guiding means, said indicator member being so pivoted that it tends to fall away from the guiding means, the float as it rises along the guiding means permitting the indicator member to fall away from the guiding means, the center of gravity of said float lying between the guiding member and the indicator means.

6. In a fluid gage indicator, the combination with a fixed guiding means, of an indicator member free at one end to move to an indicating position and at its opposite end pivoted at a point such that normally the indicator member tends to fall away from the guiding means, a float slidably mounted upon one of said means and slidably engaging with the other of said means, said float being so mounted that the greater portion of its mass lies between the indicator member and the guiding means.

7. In a fluid gage indicator, the combination with a fixed guiding rod, of an indicator rod having one end free to move to indicating position and pivoted at the opposite end, a float having an opening through the body thereof, said opening being off center, said float being so mounted that one of said rods extends through the opening therein, said float being adapted to slidably engage the other rod, substantially as specified.

8. In a fluid gage indicator, the combination with a fixed guiding rod, of an indicator rod pivoted at one end, a float having sliding engagement with both indicator and guiding rod, a crank arm with which the end of the indicator rod opposite the pivoted end has engagement, a dial plate, a short shaft extending through the dial plate and secured at one end to the aforesaid crank, an indicating member secured to the opposite end of said crank.

9. In a fluid gage indicator, the combination with a fixed guiding rod, of an indicator rod pivoted at one end adjacent the inner end of the guiding rod at a point such that normally the indicator rod tends to fall away from the guiding rod, a float having sliding engagement with both indicator rod and guiding rod, a crank with which the end of the guiding rod opposite to the pivoted end coöperates, said crank being formed with a slot into which the indicating rod extends, a dial plate, a short shaft extending through the dial plate and secured at one end to the crank, an indicator secured to the opposite end of said crank, a frame having a slot therein through which the said indicating rod extends to guide the same.

10. In an indicating device comprising a guide, a float adapted to move from a lower to a higher level corresponding to the level of liquid, an indicating member inclined relative to the path of movement of the float, a connection between the float and indicating member permitting relative movement between said parts, said indicating member tending to move its indicating portion from the position of a low level toward the position of a higher level and said float being adapted to control such movement of said indicating member during the rising movement of the float.

11. An indicating device comprising a guide, a float adapted to move from a lower to a higher level corresponding to the level of liquid, an indicating member inclined relative to the path of movement of the float, a connection between the float and indicating member permitting relative movement between said parts, said indicating member having an excess of weight on one side of its pivot, said excess of weight tending to move the indicating member from an indicating position of low level to an indicating position of higher level, and said float being adapted to control such movement of said indicating member during the rising movement of the float.

12. An indicating device comprising a guide, a float adapted to move from a lower to a higher level corresponding to the level of liquid, indicating mechanism comprising an indicating member inclined relative to the path of movement of the float, a connection between the float and indicating member permitting relative movement between said parts, said indicating mechanism having a pivotal support and having its center of gravity falling outside of its pivot and on the side of said pivot tending to move said inclined indicating member into parallelism with the path of movement of the float, and said float being adapted to control such movement of said indicating member during the rising movement of the float.

In testimony whereof, I hereunto affix my signature in the presence of two witnesses.

PHELPS M. FREER.

Witnesses:
F. Y. PONSKER,
R. M. O'CONNER.